US011954781B2

(12) United States Patent
Yang

(10) Patent No.: US 11,954,781 B2
(45) Date of Patent: Apr. 9, 2024

(54) VIDEO PROCESSING METHOD AND APPARATUS, AND ELECTRONIC DEVICE AND COMPUTER-READABLE STORAGE MEDIUM

(71) Applicant: Beijing Zitiao Network Technology Co., Ltd., Beijing (CN)

(72) Inventor: Shuyun Yang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/332,318

(22) Filed: Jun. 9, 2023

(65) Prior Publication Data

US 2023/0316625 A1 Oct. 5, 2023

Related U.S. Application Data

(63) Continuation of application No. PCT/CN2021/133179, filed on Nov. 25, 2021.

(30) Foreign Application Priority Data

Dec. 30, 2020 (CN) .......................... 202011609158.0

(51) Int. Cl.
*G06T 13/80* (2011.01)
(52) U.S. Cl.
CPC .................... *G06T 13/80* (2013.01)
(58) Field of Classification Search
None
See application file for complete search history.

(56) References Cited

U.S. PATENT DOCUMENTS

2016/0027202 A1 1/2016 Sudheendra et al.
2018/0335927 A1* 11/2018 Anzures ............... G06V 40/176
2020/0358726 A1* 11/2020 Dryer ................... H04L 51/214

FOREIGN PATENT DOCUMENTS

CN 101923435 A * 12/2010
CN 105404489 A 3/2016
(Continued)

OTHER PUBLICATIONS

Wang et al.; "Digital Twin: Acquiring High-Fidelity 3D Avatar from a Single Image;" Dec. 7, 2019; arXiv preprint arXiv:1912.03455; pp. 1-20 (Year: 2019).*

(Continued)

*Primary Examiner* — Peter Hoang
(74) *Attorney, Agent, or Firm* — Astute IP Law Group

(57) ABSTRACT

Embodiments of the present disclosure provide a video processing method, a video processing apparatus, an electronic device and a computer-readable storage medium. The video processing method includes: displaying an initial image which includes a first-style image; in response to a first trigger event, displaying an image switching animation which is used for presenting a dynamic process of the switching from the initial image to a target image which includes a second-style image; and in response to completion of the displaying of the image switching animation, displaying the target image. A switching image in the image switching animation includes a first image area, a second image area and a third image area, and the first image area covers the entire image area of the image switching animation by means of position movement and in a time-sharing manner, and has a change in shape during a position movement process.

20 Claims, 8 Drawing Sheets

(56) References Cited

FOREIGN PATENT DOCUMENTS

| | | |
|---|---|---|
| CN | 108765278 A | 11/2018 |
| CN | 109035374 A | 12/2018 |
| CN | 110135349 A | 8/2019 |
| CN | 110825286 A | 2/2020 |
| CN | 111277893 A | 6/2020 |
| CN | 111738910 A | 10/2020 |
| CN | 112764845 A | 5/2021 |
| JP | 2012027687 A | 2/2012 |
| JP | 2019032821 A | 2/2019 |
| KR | 20200143464 A | 12/2020 |

OTHER PUBLICATIONS

Machine Translation of CN101923435A (Year: 2010).*
International Search Report and Written Opinion in PCT/CN2021/133179, dated Feb. 24, 2022, 7 pages.

* cited by examiner

200

VIDEO PROCESSING METHOD AND APPARATUS, AND ELECTRONIC DEVICE AND COMPUTER-READABLE STORAGE MEDIUM

CROSS-REFERENCE TO RELATED APPLICATION

This application is a continuation of International Patent Application No. PCT/CN2021/133179, filed on Nov. 25, 2021, which claims the priority to Chinese Patent Application No. 202011609158.0 filed on Dec. 30, 2020. All the aforementioned patent applications are incorporated herein by reference in its entirety as part of the present application.

TECHNICAL FIELD

The embodiments of the present disclosure relate to a video processing method and apparatus, an electronic device and a computer-readable storage medium.

BACKGROUND

With the rapid development of science technology and economy, video applications have gradually entered people's lives and even become a part of their lives. For example, users can shoot videos anytime, anywhere, and share shot videos on social network sites to share their lives, engage in social interaction, and increase the fun of their lives through videos.

SUMMARY

The summary section is provided to briefly introduce the concepts, and the concepts will be described in detail in the detailed description section later. The summary section is not intended to identify key features or necessary features of the claimed technical solution, nor is intended to limit the scope of the claimed technical solution.

At least one embodiment of the present disclosure provides a video processing method, comprising: displaying an initial image, wherein the initial image comprises a first style image, and the first style image is an image that is obtained based on a captured image; in response to a first triggering event, displaying an image switching animation, wherein the image switching animation is used to demonstrate a dynamic process of switching from the initial image to a target image, the target image comprises a second style image, the second style image is an image that is obtained based on a captured image, and the first style image and the second style image are images of different styles; and in response to completion of displaying the image switching animation, displaying the target image, wherein a switching image in the image switching animation comprises a first image area, a second image area, and a third image area, the first image area is located between the second image area and the third image area, and the first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located.

For example, in the video processing method provided by an embodiment of the present disclosure, the first triggering event comprises at least one of: presenting a preset limb action by a target object in the captured image based on which the first style image is obtained being detected, presenting a preset facial action by the target object in the captured image based on which the first style image is obtained being detected, or receiving a preset voice.

For example, in the video processing method provided by an embodiment of the present disclosure, a displacement speed of the position movement of the first image area and a deformation speed of the shape change of the first image area during the dynamic process are determined based on the first triggering event.

For example, in the video processing method provided by an embodiment of the present disclosure, in a case where the first triggering event comprises presenting a preset limb action by a target object in the captured image based on which the first style image is obtained being detected, the displacement speed of the position movement and the deformation speed of the shape change of the first image area during the dynamic process are determined based on an action range of the preset limb action; in a case where the first triggering event comprises presenting a preset limb action by a target object in the captured image based on which the first style image is obtained being detected, the displacement speed of the position movement and the deformation speed of the shape change of the first image area during the dynamic process are determined based on a deformation amplitude of the preset facial action; and in a case where the first triggering event comprises receiving the preset voice, the displacement speed of the position movement and the deformation speed of the shape change of the first image area during the dynamic process are determined based on at least one of a speed of the preset voice, a volume of the preset voice, or content of the preset voice.

For example, in the video processing method provided by an embodiment of the present disclosure, the first style image is the captured image based on which the first style image is obtained, and the second style image is an image that is obtained by performing style transfer on the captured image based on which the second style image is obtained.

For example, in the video processing method provided by an embodiment of the present disclosure, the second style image is an image that is obtained by inputting the captured image based on which the second style image is obtained into a style transfer model and outputting from the style transfer model; and the style transfer model is obtained by training a machine learning model through sample images, the sample images comprise an original image and a transfer image, the original image is an image obtained by shooting a sample object, and the transfer image is an image obtained by performing style creation on the sample object.

For example, in the video processing method provided by an embodiment of the present disclosure, the video processing method further comprises in response to a second triggering event occurring during a display process of the image switching animation, controlling the dynamic process to stop and displaying an image of the image switching animation corresponding to a moment when the dynamic process stops.

For example, in the video processing method provided by an embodiment of the present disclosure, the initial image further comprises a first preset image, the first preset image surrounds the first style image; and the target image further comprises a second preset image, and the second preset image surrounds the second style image.

For example, in the video processing method provided by an embodiment of the present disclosure, the image switching animation is displayed by performing image rendering on a first canvas layer, a second canvas layer, and a third canvas layer, the second canvas layer is closer to a display side than the first canvas layer, and the third canvas layer is closer to the display side than the second canvas layer; the switching material is rendered on the third canvas layer, the portion of the initial image at the position where the second image area is located is rendered on the second canvas layer, and the portion of the target image at the position where the third image area is located is rendered on the first canvas layer; and areas in the first canvas layer, the second canvas layer, and the third canvas layer that are not rendered and displayed are transparent.

At least one embodiment of the present disclosure provides a video processing apparatus, comprising: a display unit, configured to display an initial image, wherein the initial image comprises a first style image, and the first style image is an image that is obtained based on a captured image; and a switching unit, configured to display an image switching animation in response to a first triggering event, wherein the image switching animation is used to demonstrate a dynamic process of switching from the initial image to a target image, the target image comprises a second style image, the second style image is an image that is obtained based on a captured image, and the first style image and the second style image are images of different styles, wherein the display unit is further configured to display the target image in response to a completion of displaying the image switching animation, a switching image in the image switching animation comprises a first image area, a second image area, and a third image area, the first image area is located between the second image area and the third image area, and the first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located.

At least one embodiment of the present disclosure provides an electronic device, comprising: a processor; and a memory, comprising one or more computer program modules, the one or more computer program modules are stored in the memory and are configured to be executed by the processor, and the one or more computer program modules comprise instructions for implementing the video processing method provided by any one of embodiments of the present disclosure.

At least one embodiment of the present disclosure provides a computer-readable storage medium, the computer-readable storage medium is configured to store non-volatile computer-readable instructions, and in a case where the non-volatile computer-readable instructions are executed by a computer, the video processing method provided by any one of embodiments of the present disclosure is implemented.

BRIEF DESCRIPTION OF THE DRAWINGS

In order to more clearly illustrate the technical solution of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
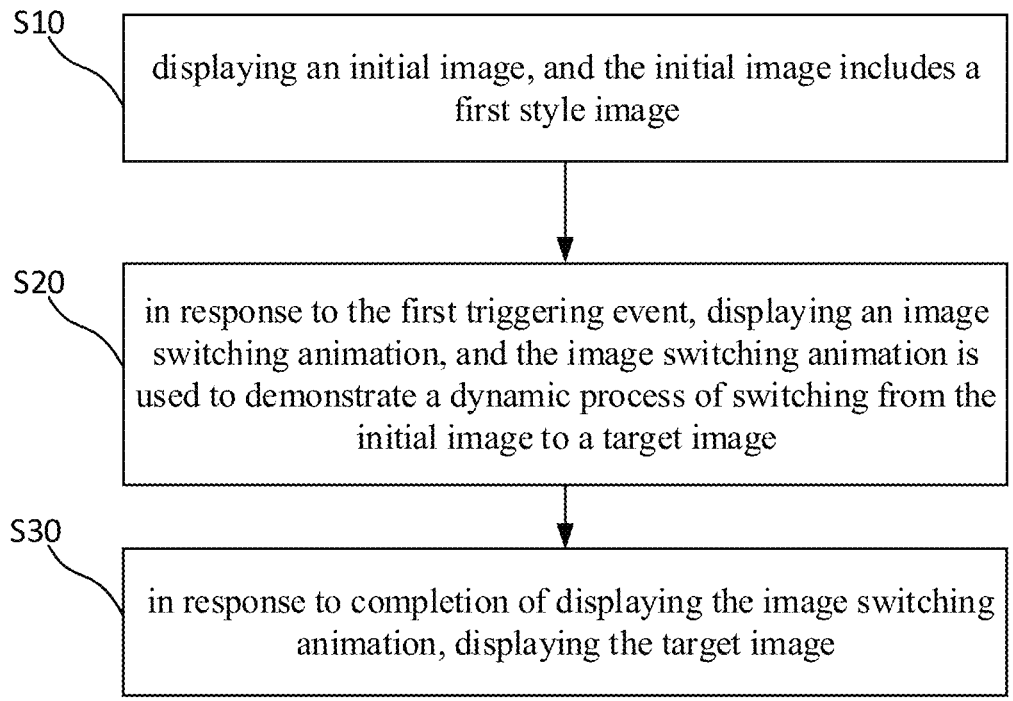
FIG. 1A is a flowchart of a video processing method provided by at least one embodiment of the present disclosure.

In order to make objects, technical schemes and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

It should be understood that the steps described in the method embodiments of the present disclosure may be executed in different orders, and/or executed in parallel. In addition, the method embodiments may include additional steps and/or omit the steps shown. The scope of the present disclosure is not limited in this regard.

The terms "comprising" and variations thereof as used herein are open-ended, i.e., "including but not limited to". The term "based on" is "based at least in part on". The term "one embodiment" means "at least one embodiment"; the term "another embodiment" means "at least one further embodiment"; the term "some embodiments" means "at least some embodiments". The relevant definitions of other terms will be given in the following descriptions.

It should be noted that the concepts such as "first" and "second" mentioned in the present disclosure are only used for distinguishing different apparatuses, modules or units, and are not used to limit the order or interdependency relationship of the functions performed by these apparatuses, modules or units.

It should be noted that the modification of "a" and "a plurality of" mentioned in this disclosure is schematic and non-limiting, and it should be understood by those skilled in the art that unless the context clearly indicates, it should be understood that "one or more".

The inventor(s) found that in the process of using video applications, users often want to obtain a video with a plurality of different image styles, and the video includes video clips with a plurality of different image styles. In related technologies, if users want to obtain a video with a plurality of different image styles, they often need to prepare video clips with different image styles separately, and then combine these video clips with different image styles into one video by video editing software.

The above related technologies not only require users to prepare video clips in advance, but also the switching process from a video clip with one image style to a video clip with another image style is relatively rigid and not smooth, which reduces the user experience.

At least one embodiment of the present disclosure provides a video processing method, a video processing apparatus, an electronic device, and a computer-readable storage medium. The video processing method includes: displaying an initial image, the initial image includes a first style image, and the first style image is an image that is obtained based on a captured image; in response to a first triggering event, displaying an image switching animation, wherein the image switching animation is used to demonstrate a dynamic process of switching from the initial image to a target image, the target image comprises a second style image, the second style image is an image that is obtained based on a captured image, and the first style image and the second style image are images of different styles; and in response to the completion of displaying the image switching animation, displaying the target image. A switching image in the image switching animation includes a first image area, a second image area, and a third image area, the first image area is located between the second image area and the third image area, and the first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located. This video processing method can reduce the complexity of users preparing video clips with different image styles, make the switching between video clips with different image styles smoother, provide a new way of switching video clips, and improve the user experience.

It should be noted that the video processing method provided by the embodiments of the present disclosure may be at least partially applied to appropriate electronic devices. For example, in some embodiments, the video processing method can be implemented locally through application programs installed in an electronic device or non-installed application programs (e.g. small programs, fast applications and the like that exist in the industry) downloaded from a cloud server. The electronic device may include personal computers, mobile terminals, etc. The mobile terminals may be mobile phones, tablets, wearable electronic devices, smart home devices, etc. For example, in some embodiments, the video processing method may also be implemented through a server, or some steps in the video processing method may be implemented through a server (such as a cloud server), and the other steps may be implemented locally through an electronic device. For example, electronic devices may communicate with each other through a network (such as a wireless or wired communication network) to obtain the processed video.

FIG. 1A is a flowchart of a video processing method provided by at least one embodiment of the present disclosure.

As shown in FIG. 1A, the method includes steps S10~S30.

Step S10: displaying an initial image, and the initial image includes a first style image.

Step S20: in response to the first triggering event, displaying an image switching animation, and the image switching animation is used to demonstrate a dynamic process of switching from the initial image to a target image. The target image includes a second style image.

Step S30: in response to completion of displaying the image switching animation, displaying the target image.

For example, a switching image in the image switching animation includes a first image area, a second image area, and a third image area, the first image area is located between the second image area and the third image area. The first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located.

This method can reduce the complexity of users preparing video clips with different image styles, make the switching between video clips with different image styles smoother through the image switching animation, provide a new way of switching video clips, and improve the user experience.

For step S10, in some embodiments of the present disclosure, the first style image is an image that is obtained based on a captured image. For example, the captured image may be an image that is captured by a shooting device at different moments. The images captured by the shooting device at different moments may be different, so the initial image obtained at different moments and the target images obtained based on the initial images at different moments can also be different. For example, the shooting device may be a camera.

For example, the first style image may be a real-time captured image, which may be an image that is captured by an image shooting apparatus in real-time and displayed on a display screen. For example, the image shooting apparatus may be the aforementioned shooting device, which may be a camera. The image displayed in real-time on the display screen may be a live-action image that is not processed by the image shooting apparatus in real-time, such as an original live-action image, or the image displayed in real-time on the display screen may also be an image having the first style that is obtained by real-time filtering, smoothing, filling, and other processing to the live-action image captured by the image shooting apparatus.

Of course, in other embodiments of the present disclosure, the first style image may not be the image captured in real-time by the image shooting apparatus. For example, the first style image may be a captured image directly obtained from a local memory or downloaded from the cloud.

In some embodiments of the present disclosure, the initial image may not only include the first style image but also include a first preset image, and the first preset image surrounds the first style image. The first preset image may be a map, a dynamic image, etc.

Figure 1B:
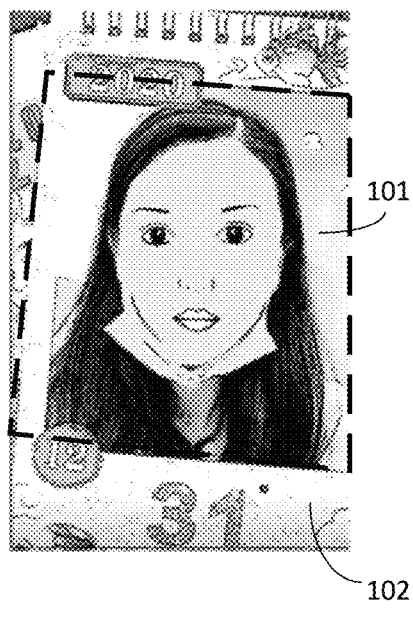
FIG. 1B is a schematic diagram of displaying an initial image through step S10 in FIG. 1A.

FIG. 1B is a schematic diagram of displaying the initial image through step S10 in FIG. 1A.

As shown in FIG. 1B, for example, the initial image 100 may be displayed on the display screen of an electronic device. The initial image 100 may include the first style image 101 (inside the dashed box) and the first preset image 102 (outside the dashed box).

The first style image 101 may be, for example, a captured image obtained by an image shooting apparatus capturing a target object. The first preset image 102 may be, for example, a calendar map. For example, when using an image shooting apparatus to capture a video in real-time, a plurality of sequential initial images are displayed on the display screen in real-time.

For step S20, the first triggering event may be, for example, at least one of: presenting a preset limb action by a target object in the captured image based on which the first style image is obtained being detected, presenting a preset facial action by the target object in the captured image based on which the first style image is obtained being detected, or receiving a preset voice.

The preset limb action may be, for example, a limb of the target object sliding on the display screen or sliding within the view field of the image shooting apparatus. The limb may be, for example, the user's head, hands, etc. The preset facial action may be, for example, deformation of the user's mouth or blinking, etc.

For example, various ways may be used to detect a limb action in the video, that is action detection. An action detection task is similar to an object detection task, both require first locating the target and then identifying the target. Exemplary methods include SCNN (multi-stage network), TURN (Temporal Unit Regression Network), TAG (Temporal Action Grouping), CDC Network (Convolutional-De-Convolutional Network) method, SSN (Structured Segment Network), CBR (Cascaded Boundary Regression Network), etc. The embodiments of the present disclosure are not limited to a specific action detection method.

In response to the first triggering event, an image switching animation is displayed to demonstrate the dynamic process of switching from the initial image to the target image through the image switching animation. The image switching animation may include, for example, a plurality of sequential switching images. At least one of the switching images may include, for example, the first image area, the second image area, and the third image area. The first image area is located between the second image area and the third image area. The first image area is used to display a switching material, the second image area is used to display a portion of the initial image, the portion of the initial image is at the position where the second image area is located, the third image area is used to display a portion of the target image, and the portion of the target image is at the position where the third image area is located.

Figure 1C:
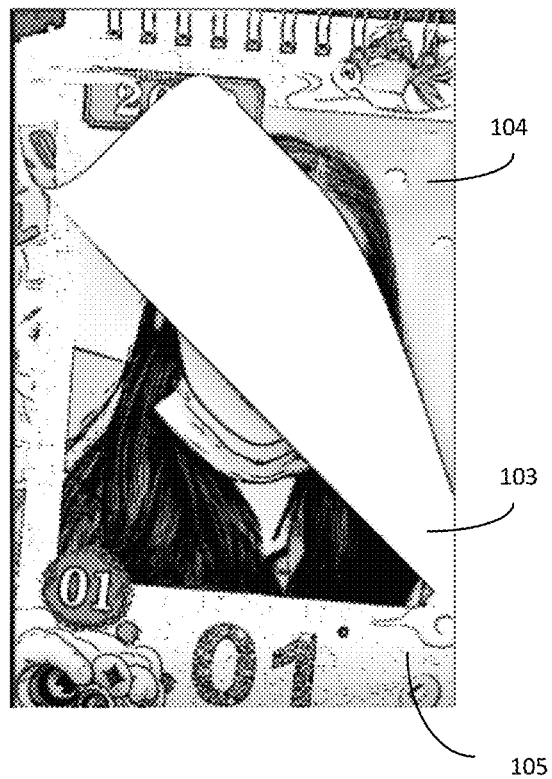
FIG. 1C is a schematic diagram of a switching image of the image switching animation provided by at least one embodiment of the present disclosure.

FIG. 1C is a schematic diagram of a switching image in the image switching animation provided by at least one embodiment of the present disclosure.

It should be understood that the switching image shown in FIG. 1C is only one frame of switching images in the image switching animation, and the image switching animation may be an animation composed of a plurality of frames of different switching images. Moreover, FIG. 1C is only an example and does not have a limiting effect on the embodiments of the present disclosure.

As shown in FIG. 1C, the switching image may include the first image area 103, the second image area 104, and the third image area 105. The first image area 103 is located between the second image area 104 and the third image area 105.

The first image area 103 is used to display a switching material. As shown in FIG. 1C, the switching material may be, for example, a white solid fill image. Of course, the switching material may also be an image with a pattern. The switching material shown in FIG. 1C is only an example, and it does not mean that the switching material can only be a white solid fill image.

The second image area 104 is used to display a portion of the initial image, the portion of the initial image is at the position where the second image area 104 is located. The initial image may be, for example, obtained by real-time capturing. As shown in FIG. 1B, for example, a portion of the initial image 100 at the position where the second image area 104 is located may be the top of the target object's head, the background formed by the partial environment where the target object is located, and a calendar map. Therefore, the second image area 104 displaying a portion of the initial image 100 at the position where the second image area 104 is located may include displaying the top of the target object's head, the background formed by the partial environment where the target object is located, and a calendar map.

The third image area 105 is used to display a portion of the target image, and the portion of the target image is at a position where the third image area 105 is located. The target image includes a second style image. The second style image is an image that is obtained based on the captured image, and the first style image and the second style image are images of different styles. In some embodiments of the present disclosure, the second style image is an image that is obtained by performing style transfer on a captured image. The captured image may be, for example, an image captured in real-time by an image shooting apparatus.

In some embodiments of the present disclosure, the second style image is an image that is obtained by inputting the captured image based on which the second style image is obtained into a style transfer model and outputting from the style transfer model. For example, the second style image may be an image that is obtained by performing style transfer on a captured image, and the captured image is obtained by shooting the target object by the image shooting apparatus. For example, the captured image based on which the second style image is obtained may be input into a style transfer model to obtain an image with Hong-Kong-comics style output from the style transfer model.

The style transfer model is obtained by training a machine learning model through sample images, the sample images include an original image and a transfer image, the original image is an image obtained by shooting a sample object, and the transfer image is an image obtained by performing style creation on the sample object.

The transfer image may be, for example, an image with Hong-Kong-comics style, an image with oil painting style, or a sketch image. For example, by using the original images as the input of the machine learning model and the transfer images as the output of the machine learning model, a style transfer model may be trained.

For example, the captured image based on which the second style image is obtained may be input into the style transfer model to obtain an image with Hong-Kong-comics style output from the style transfer model (i.e., the second style image), or a style had by the image output from the style transfer model may be determined based on the user's selection. For example, users may select "oil painting style", "traditional Chinese painting style", etc. in the application program, and therefore the style transfer model transfers the style of the captured image to output the second style image with oil painting style, traditional Chinese painting style, etc. In this case, a plurality of style transfer models may be used, and the images output by various style transfer models have different styles. Therefore, based on the user's selection, the captured image is input into the corresponding style transfer model to obtain a corresponding style image.

It should be noted that when the third image area 105 displays a portion of the target image at the position where the third image area 105 is located, the second image area 104 displays a portion of the initial image at the position where the second image area 104 is located, at this time, the initial image and the target image are obtained at the same time, and the style of the initial image and the style of the target image are different. That is to say, both the initial image and the target image may be images with different styles that are obtained based on the real-time captured images.

Figure 1D:
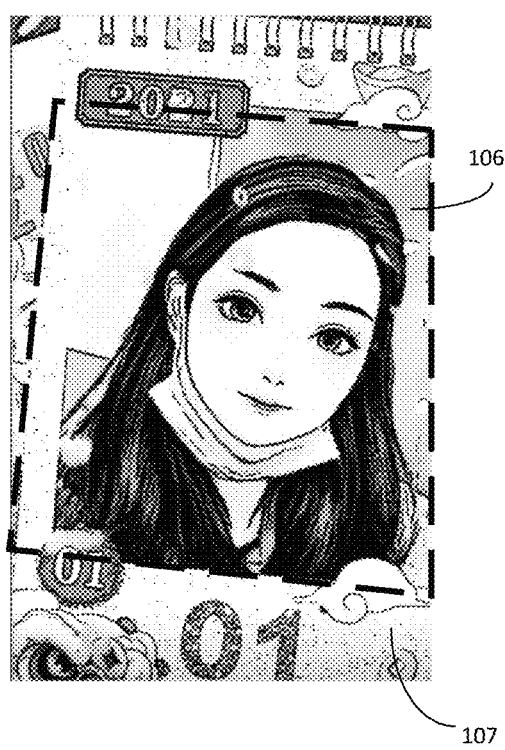
FIG. 1D is a schematic diagram of a target image provided by at least one embodiment of the present disclosure.

As shown in FIG. 1C, the third image area 105 may display, for example, a portion of the target image at the position where the third image area 105 is located. As shown in FIG. 1D, for example, a portion of the target image at the position where the third image area 105 is located may include the lower left part of the target object's face and the tail of the hair, and therefore this portion of the image is displayed in the third image area 105 of the switching image.

In some embodiments of the present disclosure, the first image area 103 covers an entire image area of the image switching animation through position movement during the dynamic process and undergoes shape change during the position movement. It may be understood that at the beginning of the image switching animation, the switching image may only have the second image area, that is, the display screen displays the first style image, and the second style image is not displayed. For example, the first image area may move from the bottom left corner to the right and above, and the first image area covers the entire image area by position movement. And during the position movement of the first image area, the shape of the first image area is changed. For example, the first image area may perform position movement and shape change according to a flipping pattern, so that the image switching animation can present a flipping effect. In the following, the rendering layer of the image switching animation and the principle that the position movement of the first image area and shape change during the position movement are explained in combination with FIG. 4 and FIG. 5, and details are not repeated here.

It should be noted that the first image area may also move to the right and bottom from the top left corner, or it can also move to the left and bottom from the top right corner. In short, the present disclosure does not limit the movement way of the first image area.

For step S30, for example, when the entire image area of the image switching animation is covered in a time-sharing way through position movement during the dynamic process (for example, covered in a time-sharing way may refer to covering different portions at different moments, rather than completely covering the entire image area at a same moment), the display of the image switching animation is completed.

In some embodiments of the present disclosure, when the display of the image switching animation is completed, the target image corresponding to the moment of completion of the image switching animation may be displayed on the display screen, for example.

In some embodiments of the present disclosure, for example, in a case where the display of the image switching animation is completed, if the image shooting apparatus is used to keep on capturing videos in real-time, the display screen may display a plurality of sequential target images with the second style image in real-time.

FIG. 1D is a schematic diagram of the target image provided by at least one embodiment of the present disclosure.

As shown in FIG. 1D, for example, the target image 200 may be displayed on the display screen. The target image 200 may include the second style image 106 (inside the dashed box) and the second preset image 107. In some embodiments of the present disclosure, the target image may not only include the second style image 106, but also include the second preset image 107 (outside the dashed box), and the second preset image 107 surrounds the second style image. The second preset image may be, for example, a texture, a dynamic image, etc. The second preset image may be the same with the first preset image or different from the first preset image.

The second style image 106 may be, for example, an image that is obtained by style transfer on the captured image obtained by shooting the target object through the image shooting apparatus. For example, the real-time captured image may be input into a style transfer model to obtain an image with Hong-Kong-comics style.

The second preset image 107 may be, for example, a calendar map. As shown in FIG. 1D and FIG. 1B, the second preset image 107 and the first preset image 102 may be different, for example, the second preset image 107 and the first preset image 102 may be calendar maps showing different dates, that is, the dates on the calendar maps are changed.

It can be understood that at the beginning of the image switching animation, the switching image may only have the second image area, that is, the first style image is displayed, and the second style image is not displayed. At the end of the image switching animation, the switching image may only have the third image area, that is, the second style image is displayed, and the first style image is not displayed.

In some embodiments of the present disclosure, a displacement speed of the position movement of the first image area and a deformation speed of the shape change of the first image area during the dynamic process are determined based on the first triggering event. That is to say, according to the first triggering event, determining the displacement speed of the position movement and the deformation speed of the shape change of the first image area during the dynamic process. This embodiment provides a method for controlling the displacement speed and the deformation speed of the image switching animation, thereby enhancing the fun of the video processing method, enriching the functionality of the video processing method, and improving the user experience.

In some embodiments of the present disclosure, in a case where the first triggering event includes presenting a preset limb action by a target object in the captured image based on which the first style image is obtained being detected, the displacement speed of the position movement and the deformation speed of the shape change of the first image area during the dynamic process are determined based on the amplitude of the preset limb action.

For example, if the first triggering event includes that a finger of the target object in the captured image sliding is detected, the displacement speed of the position movement and the deformation speed of the shape change of the first image area during the dynamic process may be determined based on the sliding distance of the finger. For example, in some examples, the longer the sliding distance of the finger, the faster the displacement speed of the position movement and the deformation speed of the shape change of the first image area during the dynamic process.

In some embodiments of the present disclosure, in a case where the first triggering event includes presenting a preset facial action by the target object in the captured image based on which the first style image is obtained being detected, the displacement speed of the position movement and the deformation speed of the shape change of the first image area during the dynamic process are determined based on the deformation amplitude of the preset facial action. For example, in some examples, the larger the deformation amplitude of the preset facial action, the faster the displacement speed of the position movement and the deformation speed of the shape change of the first image area during the dynamic process.

For example, if the first triggering event includes that the facial action by the target object in the captured image changing from not smiling to smiling is detected, the displacement speed of the position movement and the deformation speed of the shape change of the first image area during the dynamic process may be determined based on the deformation amplitude of the mouth.

In some embodiments of the present disclosure, if the first triggering event includes receiving a preset voice, the displacement speed of the position movement and the deformation speed of the shape change of the first image area during the dynamic process are determined based on at least one of a speed of the preset voice, a volume of the preset voice or content of the preset voice.

For example, if the first triggering event includes receiving the preset voice "tear off the past, welcome the future", the displacement speed of the position movement and the deformation speed of the shape change of the first image area during the dynamic process may be determined based on the speed of the received preset voice "tear off the past, welcome the future". For example, in some examples, the faster the speed of the preset voice, the faster the displacement speed of the position movement and the deformation speed of the shape change of the first image area during the dynamic process.

Figure 2:
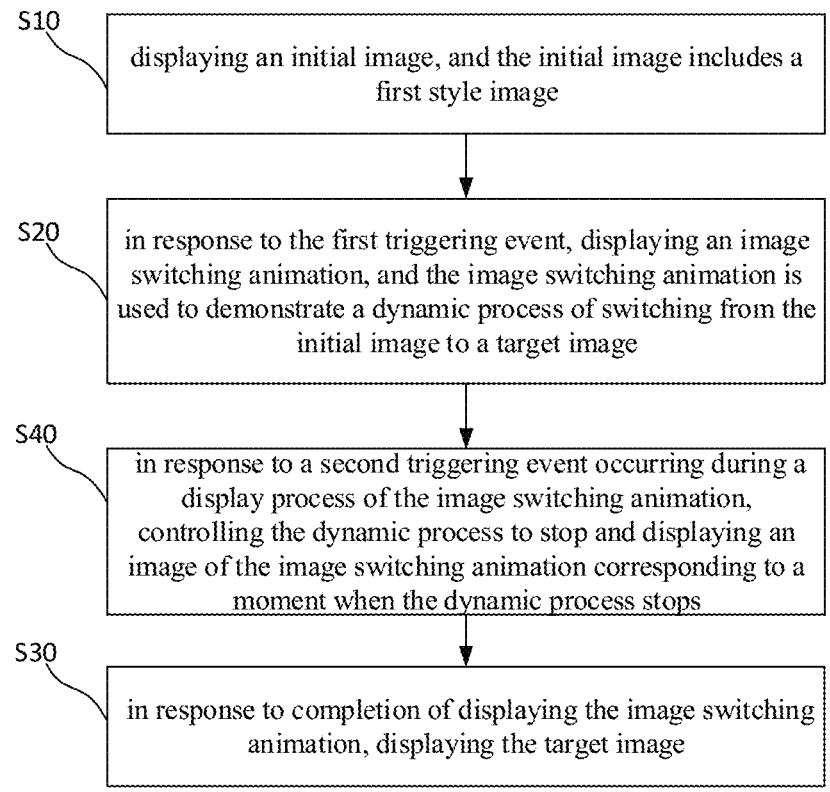
FIG. 2 is a flowchart of another video processing method provided by at least one embodiment of the present disclosure.

FIG. 2 is a flowchart of another video processing method provided by at least one embodiment of the present disclosure.

As shown in FIG. 2, the video processing method may also include step S40 on the basis of the aforementioned embodiments. Step S40 may be executed, for example, after step S20, and before step S30.

Step S40: in response to a second triggering event occurring during a display process of the image switching animation, controlling the dynamic process to stop and displaying an image of the image switching animation corresponding to a moment when the dynamic process stops.

The second triggering event may include, for example, presenting at least one of a pause limb action, a pause facial action, or a voice input by the target object in the captured image being detected.

The pause limb action may be, for example, a click action through a finger towards the display screen by the target object. The pause facial action may be, for example, extending a tongue action by the target object. The voice input may be, for example, the voice "pause" is input.

Figure 3:
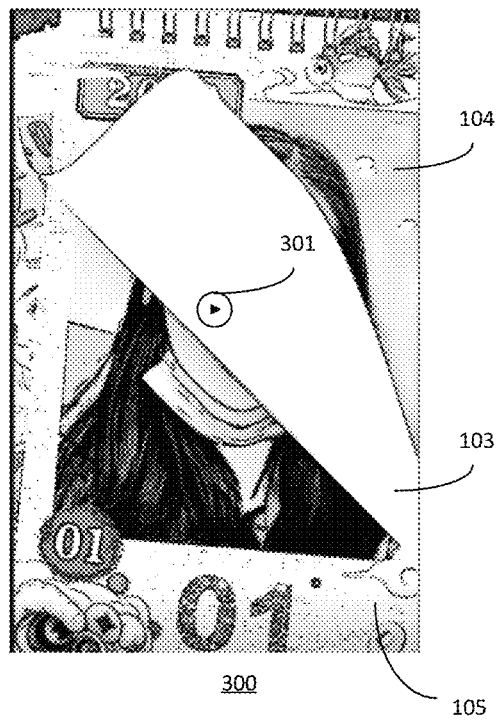
FIG. 3 is a schematic diagram of an image of the image switching animation corresponding to a moment of the dynamic process stopping provided by at least one embodiment of the present disclosure.

FIG. 3 is a schematic diagram of an image of the image switching animation at the corresponding to a moment of the dynamic process stopping provided by at least one embodiment of the present disclosure.

As shown in FIG. 3, for example, the image switching animation displays a switching image 300. In response to the occurrence of the second triggering event, the image switching animation is controlled to stop and the switching image 300 is displayed.

In some embodiments of the present disclosure, in response to the dynamic process of the image switching animation stopping, a pause indicator key 301 may be displayed on the switching image 300.

If the first triggering event includes a preset limb action and the second triggering event includes a pause limb action, then the preset limb action and the pause limb action may be different limb actions, so that it can be determined whether to display the image switching animation or pause the currently playing image switching animation according to the limb actions. Of course, the preset limb action and the pause limb action may also be the same limb actions. For example, if a limb action is detected when the image switching animation is not played, it may be determined that the limb action is a preset limb action, and the image switching animation is displayed. If a limb action is detected during the playing of the image switching animation, it can be determined that the limb action is a pause limb action. Similarly, if the first triggering event includes a predetermined facial action and the second triggering event includes a pause facial action, then the predetermined facial action and the pause facial action may be different facial actions or the same facial actions.

Figure 4:
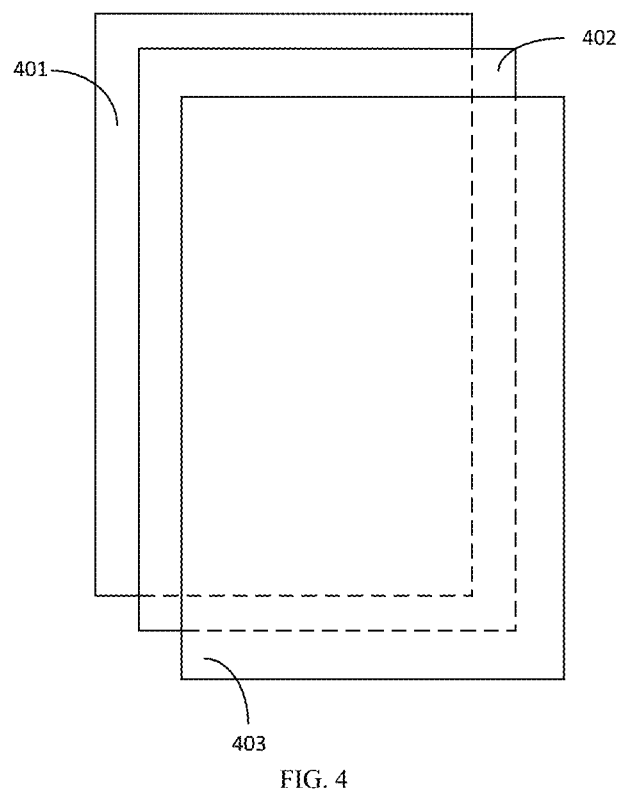
FIG. 4 is a schematic diagram of rendering layers of the image switching animation provided by at least one embodiment of the present disclosure.

FIG. 4 is a schematic diagram of the rendering layers of the image switching animation provided by at least one embodiment of the present disclosure.

As shown in FIG. 4, the image switching animation is displayed by performing image rendering on the first canvas layer 401, the second canvas layer 402, and the third canvas layer 403. The second canvas layer 402 is closer to the display side than the first canvas layer 401, and the third canvas layer 403 is closer to the display side than the second canvas layer 402. Here, the display side refers to a side where the display screen of the apparatus displaying the image switching animation faces the user, for example.

A switching material is rendered on the third canvas layer, a portion of the initial image at the position where the second image area is located is rendered on the second canvas layer, and a portion of the target image at the position where the third image area is located is rendered on the first canvas layer. The areas in the first canvas layer, the second canvas layer, and the third canvas layer that are not rendered and displayed are transparent.

For example, in the scenarios shown in FIG. 1B-FIG. 1D, the switching material 103 is rendered on the third canvas layer 403, a portion of the initial image at the position where the second image area 104 is located is rendered on the second canvas layer 402, and a portion of the target image at the position where the third image area 105 is located is rendered on the first canvas layer 401.

Figure 5:
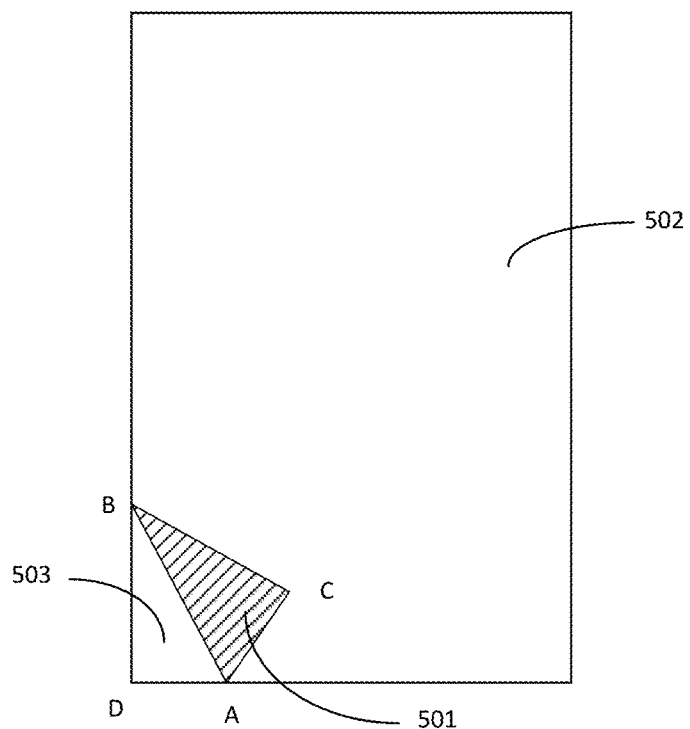
FIG. 5 is a schematic diagram of the principle of the first image area undergoing position movement and shape change during the position movement process provided by at least one embodiment of the present disclosure.

FIG. 5 is a schematic diagram of the principle of the first image area undergoing position movement and shape change during the position movement process provided by at least one embodiment of the present disclosure.

As shown in FIG. 5, in the schematic diagram of this principle, if one corner D of the first image 500 is flipped up, and corner D falls to the position of point C after flipping up, the line segment AB may be the crease formed by flipping up the corner D. The coordinates of point C, point A, and point B can be calculated, thus the first image area 501, the second image area 502, and the third image area 503 is obtained. The second image area 502 displays a portion of the initial image at the position where the second image area 502 is located. The third image area 503 displays a portion of the target image at the position where the third image area 503 is located.

In an embodiment of the present disclosure, for example, the coordinate of point C changing with time may be obtained by a page flipping curve. For example, the page flipping curve may be obtained by a person skilled in the art through fitting. For example, the starting point of point C and ending point of point C may be determined, so that the page flipping curve may be fitted according to the starting point and ending point and the flipping angle. The coordinates of point A and point B can be calculated, for example, through the positional relationship between the point A, the point B, and the point C.

Figure 6A:
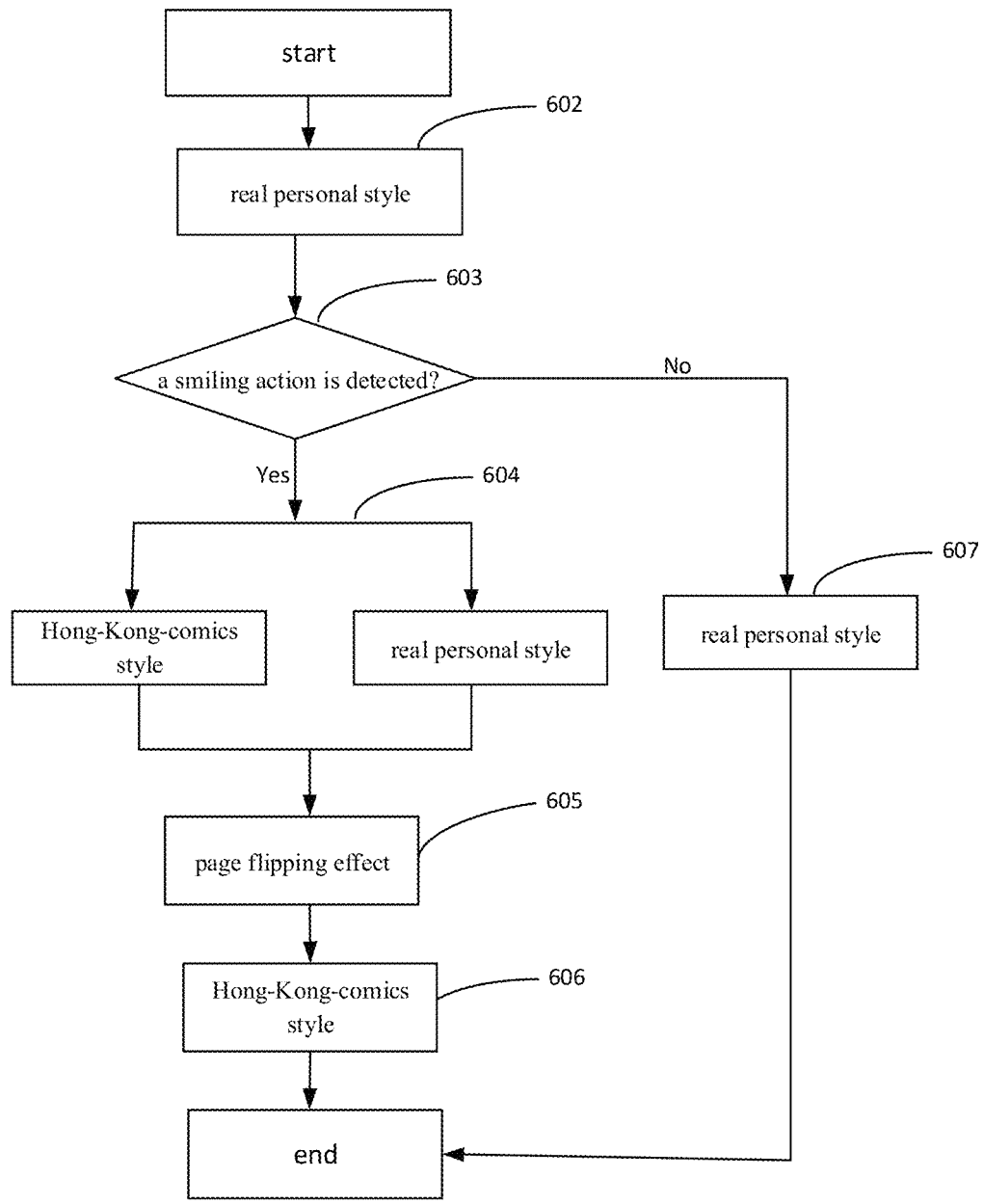
FIG. 6A is a flowchart of another video processing method provided by at least one embodiment of the present disclosure.

FIG. 6A is a flowchart of another video processing method provided by at least one embodiment of the present disclosure.

As shown in FIG. 6A, the flowchart of the video processing method may include steps S602~S607.

Step S602: displaying an initial image with real personal style on the display screen. The initial image with real personal style is the first style image. For example, step S10 described above with reference to FIG. 1A may be performed, which is not repeated here.

Step S603: determining whether a smiling action is detected. If a smiling action is detected, proceed to step S604, and a smiling action is detected, that is, the first triggering event is detected. If no smiling action is detected, proceed to step S607.

Step S604: in response to detecting a smiling action, a target image with Hong-Kong-comics style is generated in real-time according to the real-time real personal image. At this time, the image displayed on the display screen includes a portion of the target image with Hong-Kong-comics style and a portion of the initial image with real personal style.

Step S605: displaying the page flipping effect, and the page flipping effect is the image switching animation described above. For example, step S20 described above with reference to FIG. 1A can be performed, which is not repeated here.

Step S606: In a case where the display of the page flipping effect is completed, displaying the target image with Hong-Kong-comics style. For example, step S30 described above with reference to FIG. 1A may be performed, which is not repeated here.

Step S607: displaying the image with real personal style. If no smiling action is detected, the image with real personal style is displayed.

Figure 6B:
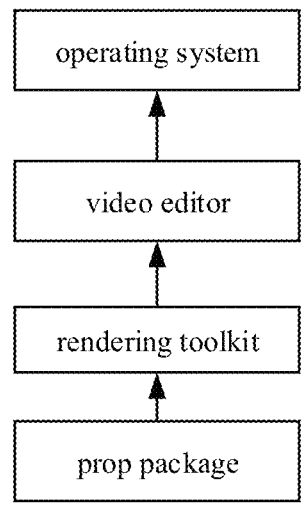
FIG. 6B is a schematic diagram of a link for achieving the video processing method provided by at least one embodiment of the present disclosure.

FIG. 6B is a schematic diagram of a link for achieving the video processing method provided by at least one embodiment of the present disclosure.

As shown in FIG. 6B, this link may include a prop package, a rendering toolkit, a video editor, and an operating system.

The prop package may be, for example, a program package used to implement the functions that the prop has. This prop has functions such as displaying the page flipping effect.

The rendering toolkit may, for example, render a video that is processed by props and transmit the rendered results to the video editor. The video editor may, for example, edit and process the rendered results to make the processed video compatible with the operating system, in order to display the page flipping effect through application programs running on the operating system.

In some embodiments of the present disclosure, the video processing method may further include initializing video processing parameters in response to receiving a capturing end instruction or a capturing pause instruction.

Figure 6C:
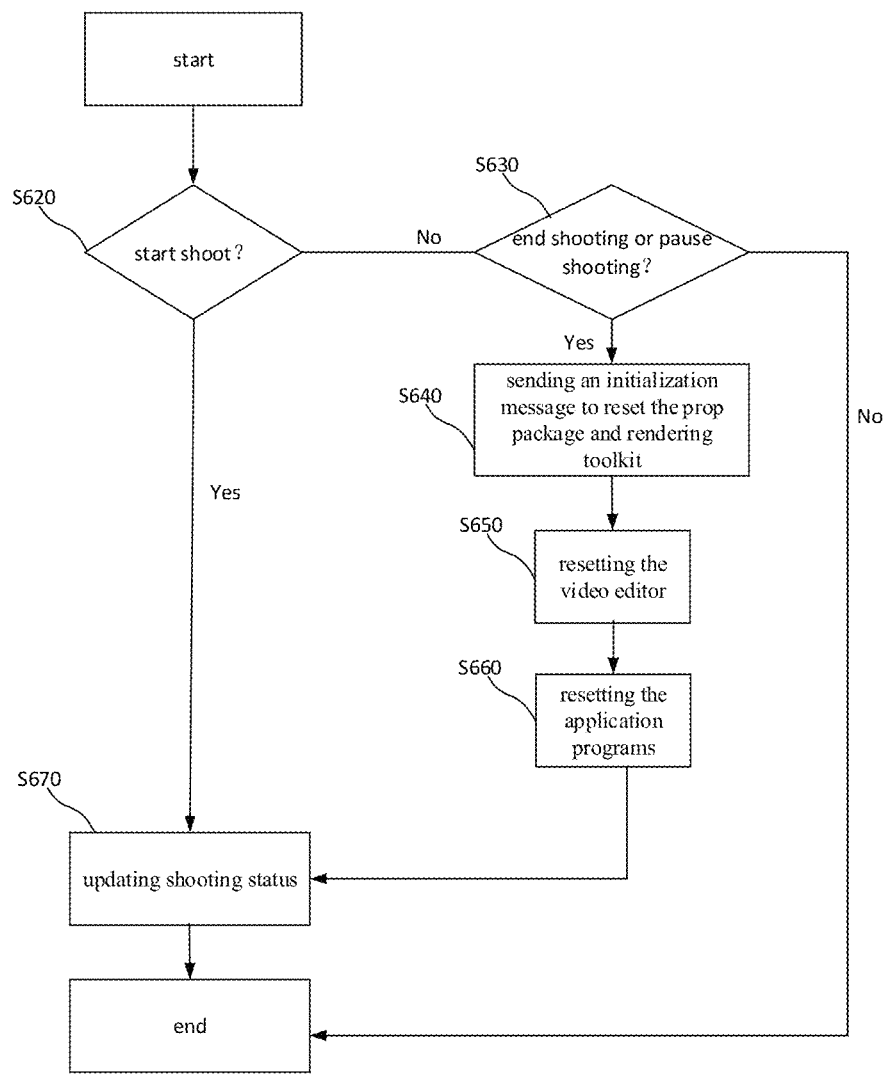
FIG. 6C is a flowchart of initialization provided by at least one embodiment of the present disclosure.

FIG. 6C is a flowchart of initialization provided by at least one embodiment of the present disclosure.

As shown in FIG. 6C, the initialization operation may include steps S620~S670.

Step S620: determining whether to start shooting. Starting shooting, for example, may refer to click the shooting button by a user, so that the image shooting apparatus enter into a shooting mode.

If shooting is not started, proceed to step S630. If shooting is started, proceed to steps S670~S680.

Step S630: determining whether the shooting status is end shooting or pause shooting.

If the shooting status is end shooting or pause shooting, proceed to steps S640~S680. If the shooting status is not end shooting or pause shooting, proceed to step S680.

Step S640: sending an initialization message to reset the prop package and rendering toolkit, so that the video processing parameters in the prop package and rendering toolkit are initialized.

Step S650: resetting the video editor. For example, the video processing parameters in the video editor may be initialized.

Step S660: resetting the application programs. For example, the application programs may be reset to the status of displaying the image with real personal style.

Step S670: updating shooting status. For example, if step S620 is "yes", the shooting status is entered, and displaying the page flipping effect in response to the first triggering event. If step S620 is "No" and step S630 is "Yes", the shooting status is updated to pause shooting or end shooting after executing steps S640~S660.

Figure 7:
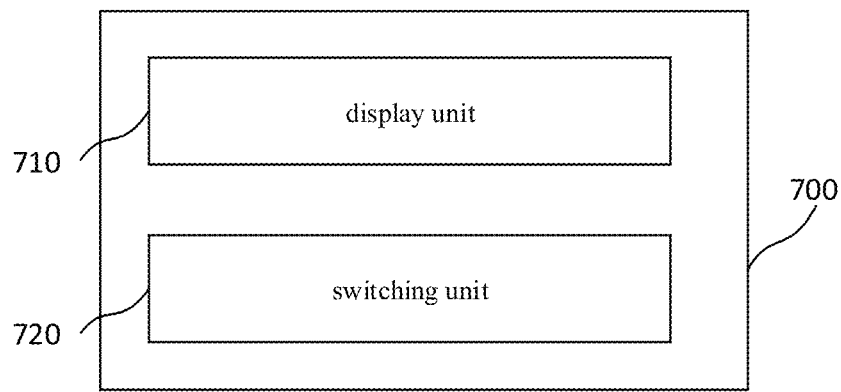
FIG. 7 is a schematic block diagram of a video processing apparatus provided by at least one embodiment of the present disclosure.

FIG. 7 is a schematic block diagram of a video processing apparatus provided by at least one embodiment of the present disclosure.

For example, as shown in FIG. 7, the video processing apparatus 700 includes a display unit 710 and a switching unit 720.

The display unit 710 is configured to display the initial image. For example, the initial image includes the first style image, and the first style image is an image obtained based on the captured image. The display unit 710 may, for example, perform step S10 with reference to FIG. 1A above.

The switching unit 720 is configured to display the image switching animation in response to the first triggering event. The image switching animation is used to demonstrate the dynamic process of switching from the initial image to the target image. For example, the target image includes a second style image, and the second style image is an image obtained based on a captured image. The first style image and the second style image are images of different styles. The switching unit 720 may, for example, perform step S20 with reference to FIG. 1A above.

The display unit 710 is further configured to display the target image in response to the completion of displaying the image switching animation. The display unit 710 may also perform step S30 with reference to FIG. 1A above, for example.

A switching image in the image switching animation includes a first image area, a second image area, and a third image area, the first image area is located between the second image area and the third image area, and the first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located.

For example, the display unit 710 and the switching unit 720 may be hardware, software, firmware, or any feasible combination of them. For example, the display unit 710 and the switching unit 720 may be dedicated or universal circuits, chips, or apparatus, or may be a combination of processors and memory. For the specific implementation forms of each unit mentioned above, the embodiments of the present disclosure do not limit them.

It should be noted that in the embodiments of the present disclosure, each unit of the video processing apparatus 700 corresponds to each step of the aforementioned video processing method. For specific functions of the video processing apparatus 700, please refer to the relevant description of the video processing method, and details are not repeated here. The components and structure of the video processing apparatus 700 shown in FIG. 7 are only exemplary and not restrictive. The video processing apparatus 700 may further include other components and structures as needed.

At least one embodiment of the present disclosure also provides an electronic device, the electronic device includes a processor and a memory, and the memory comprises one or more computer program modules. One or more computer program modules are stored in the memory and are configured to be execution by the processor, and one or more computer program modules include instructions for implementing the video processing method described above. This electronic device can reduce the complexity of users preparing video clips with different image styles, make the switching between video clips with different image styles smoother, provide a new way to switch video clips and improve the user experience.

Figure 8A:
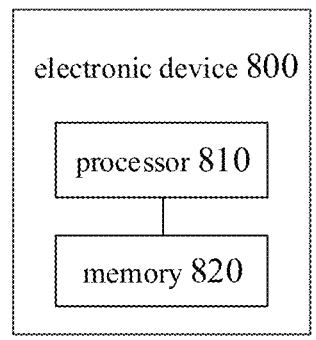
FIG. 8A is a schematic block diagram of an electronic device provided by at least one embodiment of the present disclosure.

FIG. 8A is a schematic block diagram of an electronic device provided by some embodiments of the present disclosure. As shown in FIG. 8A, the electronic device 800 includes a processor 810 and a memory 820. The memory 820 is used to store non-volatile computer-readable instructions (for example, one or more computer program modules). The processor 810 is used to run non-volatile computer-readable instructions, and in a case where the non-volatile computer-readable instructions are executed by the processor 810, the video processing method described above is executed. The memory 820 and the processor 810 may be interconnected through a bus system and/or other forms of connection mechanisms (not shown).

For example, the processor 810 may be a central processing unit (CPU), a graphics processing unit (GPU), or other forms of processing units with data processing and/or program execution capabilities. For example, the central processing unit (CPU) may be an X86 or ARM architecture. The processor 810 may be a universal or dedicated processor that can control other components in the electronic device 800 to perform desired functions.

For example, the memory 820 may include any combination of one or more computer program products, and computer program products may include various forms of computer-readable storage media, such as volatile memory and/or non-volatile memory. The volatile memory may include, for example, a random access memory (RAM) and/or a cache, etc. The non-volatile memory may include, for example, a read-only memory (ROM), a hard disk, an erasable programmable read-only memory (EPROM), a portable compact disc read-only memory (CD-ROM), a USB memory, a flash memory, etc. One or more computer program modules may be stored on a computer-readable storage medium, and the processor 810 can run one or more computer program modules to achieve various functions of the electronic device 800. Various application programs, various data, and various data used and/or generated by application programs can also be stored in the computer-readable storage media.

It should be noted that in the embodiments of the present disclosure, the specific functions and technical effects of the electronic device 800 may be referred to the description of the video processing method above, and details are not repeated here.

Figure 8B:
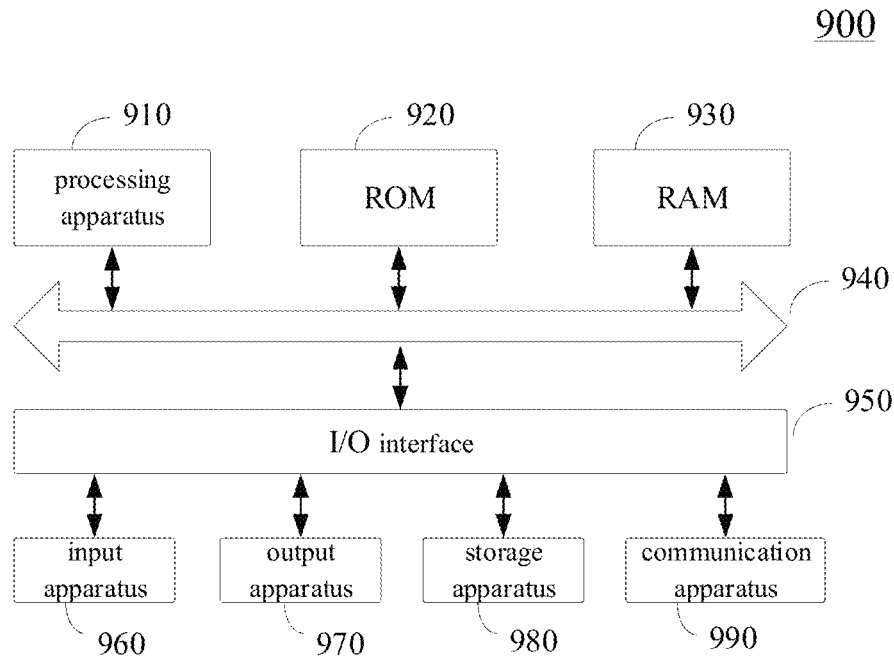
FIG. 8B is a schematic block diagram of another electronic device provided by at least one embodiment of the present disclosure.

FIG. 8B is a schematic block diagram of another electronic device provided by some embodiments of the present disclosure. The electronic device 900 is suitable for implementing the video processing method provided by the embodiments of the present disclosure, for example. The electronic device 900 may be a terminal device or the like. It should be noted that the electronic device 900 shown in FIG. 8B is only an example and does not impose any limitations on the functionality and use scope of the embodiments of the present disclosure.

As shown in FIG. 8B, the electronic device 900 may include a processing apparatus (for example, a central processing unit, a graphics processor, etc.) 910, which may perform various appropriate actions and processes according to the programs stored in the read-only memory (ROM) 920 or the programs loaded from the storage apparatus 980 into the random-access memory (RAM) 930. In the RAM 930, various programs and data required for the operation of the electronic device 900 are also stored. The processing apparatus 910, ROM 920, and RAM 930 are connected to each other through the bus 940. The input/output (I/O) interface 950 is also connected to the bus 940.

Generally, the following devices may be connected to the I/O interface 950: an input apparatus 960 including, for example, touch screens, touchpads, keyboards, mice, cameras, microphones, accelerometers, gyroscopes, etc.; an output apparatus 970 including, for example, liquid crystal displays (LCD), speakers, vibrators, etc.; a storage apparatus 980 including, for example, magnetic tapes, hard drives, etc.; and a communication apparatus 990. The communication apparatus 990 may allow the electronic apparatus 900 to perform wireless or wired communication with other electronic devices to exchange data. Although FIG. 8B shows the electronic device 900 with various devices, it should be understood that it is not required to implement or have all the shown devices, and the electronic device 900 can alternatively implement or have more or fewer apparatus.

For example, according to the embodiments of the present disclosure, the video processing method above may be implemented as a computer software program. For example, the embodiments of the present disclosure include a computer program product that includes computer programs carried on a non-volatile computer-readable medium. The computer programs include program codes for executing the aforementioned video processing method. In such embodiments, the computer programs may be downloaded and installed from the network through the communication apparatus 990, or installed from the storage apparatus 980, or installed from the ROM 920. When the computer programs are executed by the processing apparatus 910, the functions defined in the video processing method provided by the embodiments of the present disclosure may be implemented.

At least one embodiment of the present disclosure also provides a computer-readable storage medium for storing non-volatile computer-readable instructions, the computer-readable storage medium is configured to store non-volatile computer-readable instructions, and in a case where the non-volatile computer-readable instructions are executed by a computer, the computer achieves the video processing method described above. Using this computer-readable storage medium can reduce the complexity of users preparing video clips with different image styles, make the switching between video clips with different image styles smoother, provide a new way to switch video clips and improve the user experience.

Figure 9:
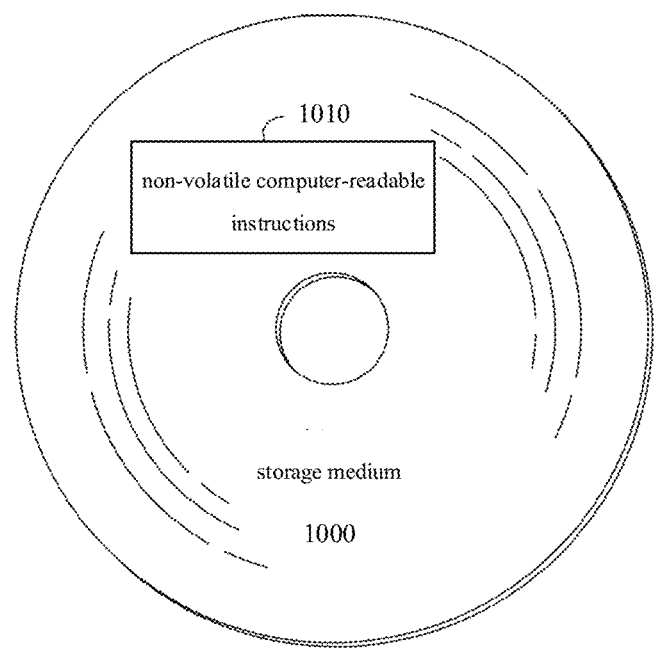
FIG. 9 is a schematic diagram of a computer-readable storage medium provided by at least one embodiment of the present disclosure.

FIG. 9 is a schematic diagram of a storage medium provided by some embodiments of the present disclosure. As shown in FIG. 9, the storage medium 1000 is used to store non-volatile computer-readable instructions 1010. For example, when the non-volatile computer-readable instructions 1010 are executed by the computer, one or more steps according to the video processing method described above may be executed.

For example, the storage medium 1000 may be applied to the electronic device 800 mentioned above. For example, the storage medium 1000 may be the memory 820 in the electronic device 800 shown in FIG. 8A. For example, the relevant description of the storage medium 1000 can refer to the corresponding description of the memory 820 in the electronic device 800 shown in FIG. 8A, details are not repeated here.

It should be noted that in the context of the present disclosure, computer-readable media may be tangible media that may include or store programs for use by instruction execution system, apparatus, device, or in combination with instruction execution system, apparatus, or device. Computer-readable media may be computer-readable signal media, computer-readable storage media, or any combination of the above two. Computer-readable storage media may be, for example, but not limited to: systems, apparatus or devices of electricity, magnetism, light, electromagnetism, infrared, or semiconductors, or any combination of the above. More specific examples of the computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination of the above. In the present disclosure, Computer-readable storage media may be any tangible media that includes or stores a program, which may be used by or in combination with the instruction execution system, apparatus, or device. In the present disclosure, the computer-readable signal media may include data signals propagated in the base band or as part of the carrier wave, in which computer-readable program codes are carried. The propagated data signals may take various forms, including but not limited to electromagnetic signals, optical signals, or any suitable combination of the above. Computer-readable signal media can also be any computer-readable media other than computer-readable storage media, which can send, propagate, or transmit programs for use by or in combination with instruction execution systems, apparatus, or devices. The program codes included on computer-readable media may be transmitted by using any suitable media, including but not limited to: wires, optical cables, RF (radio frequency), etc., or any suitable combination of the above.

In some implementations, a client and a server can communicate by using any currently known or future developed network protocol such as HTTP (Hypertext Transfer Protocol), and can interconnect with any form or medium of digital data communication (for example, communication networks). Examples of communication networks include local area networks ("LAN"), wide area networks ("WAN"), internets (for example, the Internet), and end-to-end networks (for example, ad hoc end-to-end networks), as well as any currently known or future developed networks.

The computer-readable media mentioned above may be included in the electronic device mentioned above; or they can also exist separately without being assembled into the electronic device.

The computer program codes for executing the operations of the present disclosure may be written in one or more programming languages or combinations thereof. The programming languages include but are not limited to object-oriented programming languages such as Java, Smalltalk, C++, as well as conventional procedural programming languages such as "C" or similar programming languages. Program codes may be completely executed on the user's computer, partially executed on the user's computer, executed as a standalone software package, partially executed on the user's computer and partially executed on a remote computer, or completely executed on a remote computer or server. In cases involving the remote computer, the remote computer may be connected to the user's computer through any kind of network which includes a local area network (LAN) or a wide area network (WAN)), or it may be connected to an external computer (for example, using an Internet service provider to connect through the Internet).

The flowchart and block diagram in the attached drawings show the possible architecture, functions, and operations of the system, the method, and the computer program products according to various embodiments of the present disclosure. At this point, each block in a flowchart or block diagram can represent a module, a program segment, or a part of codes that includes one or more executable instructions for implementing specified logical functions. It should also be noted that in some alternative implementations, the functions indicated in the block may also occur in a different order than those indicated in the attached drawings. For example, two consecutive indicated blocks may actually be executed in parallel, and sometimes they may also be executed in the opposite order, which depends on the functions involved. It should also be noted that each block in the block diagram and/or flowchart, and the combination of blocks in the block diagram and/or flowchart, may be implemented by using dedicated hardware-based systems that perform specified functions or operations, or may be implemented by using a combination of a dedicated hardware and computer instructions.

The involved units described in the embodiments of the present disclosure may be implemented through software or hardware. In some cases, the name of a unit does not constitute a limitation on the unit itself.

The functions described above herein may be at least partially executed by one or more hardware logic components. For example, non-restrictively, exemplary types of hardware logic components that may be used include: Field Programmable Gate Arrays (FPGA), Application Specific Integrated Circuits (ASIC), Application Specific Standard Products (ASSP), On Chip Systems (SOC), Complex Programmable Logic Devices (CPLD), and so on.

The following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

What have been described above are only specific implementations of the present disclosure, the protection scope of the present disclosure is not limited thereto. Therefore, the protection scope of the present disclosure should be based on the protection scope of the claims.

What is claimed is:

1. A video processing method, comprising:
   displaying an initial image, wherein the initial image comprises a first style image, and the first style image is an image that is obtained based on a captured image obtained by capturing a target object;
   in response to a first triggering event for the target object being detected, displaying an image switching animation, wherein the image switching animation is used to demonstrate a dynamic process of switching from the initial image to a target image, the target image comprises a second style image, the second style image is an image that is obtained based on a captured image obtained by capturing the target object, and the first style image and the second style image are images of different styles; and
   in response to completion of displaying the image switching animation, displaying the target image,
   wherein a switching image in the image switching animation comprises a first image area, a second image area, and a third image area, the first image area is located between the second image area and the third image area, and the first image area covers an entire image area of the image switching animation in a time-sharing way through position movement during the dynamic process and undergoes shape change during the position movement,
   the first image area is used to display a switching material, the second image area is used to display a portion of the initial image, the portion of the initial image is at a position where the second image area is located, the third image area is used to display a portion of the target image, and the portion of the target image is at a position where the third image area is located, and the portion of the initial image on the second image area and the portion of the target image on the third image area are obtained by capturing the target object at a same time.

2. The method according to claim 1, wherein the first triggering event comprises at least one of: presenting a preset limb action by a target object in the captured image based on which the first style image is obtained being detected, presenting a preset facial action by the target object in the captured image based on which the first style image is obtained being detected, or receiving a preset voice.

3. The method according to claim 2, wherein a displacement speed of the position movement of the first image area and a deformation speed of the shape change of the first image area during the dynamic process are determined based on the first triggering event.

4. The method according to claim 3,
   wherein, in a case where the first triggering event comprises presenting a preset limb action by a target object in the captured image based on which the first style image is obtained being detected, the displacement speed of the position movement and the deformation speed of the shape change of the first image area during the dynamic process are determined based on an action range of the preset limb action;
   in a case where the first triggering event comprises presenting a preset facial action by the target object in the captured image based on which the first style image is obtained being detected, the displacement speed of the position movement and the deformation speed of the shape change of the first image area during the dynamic process are determined based on a deformation amplitude of the preset facial action; and
   in a case where the first triggering event comprises receiving the preset voice, the displacement speed of the position movement and the deformation speed of the shape change of the first image area during the dynamic process are determined based on at least one of a speed of the preset voice, a volume of the preset voice, or content of the preset voice.

5. The method according to claim 1, wherein the first style image is the captured image based on which the first style image is obtained, and the second style image is an image that is obtained by performing style transfer on the captured image based on which the second style image is obtained.

6. The method according to claim 5, wherein the second style image is an image that is obtained by inputting the captured image based on which the second style image is obtained into a style transfer model and outputting from the style transfer model; and
   the style transfer model is obtained by training a machine learning model through sample images, the sample images comprise an original image and a transfer image, the original image is an image obtained by shooting a sample object, and the transfer image is an image obtained by performing style creation on the sample object.

7. The method according to claim 1, further comprising:
   in response to a second triggering event occurring during a display process of the image switching animation, controlling the dynamic process to stop and displaying an image of the image switching animation corresponding to a moment when the dynamic process stops.

8. The method according to claim 1, wherein the initial image further comprises a first preset image, the first preset image surrounds the first style image; and
　　the target image further comprises a second preset image, and the second preset image surrounds the second style image.

9. The method according to claim 1, wherein the image switching animation is displayed by performing image rendering on a first canvas layer, a second canvas layer, and a third canvas layer, the second canvas layer is closer to a display side than the first canvas layer, and the third canvas layer is closer to the display side than the second canvas layer;
　　the switching material is rendered on the third canvas layer, the portion of the initial image at the position where the second image area is located is rendered on the second canvas layer, and the portion of the target image at the position where the third image area is located is rendered on the first canvas layer; and
　　areas in the first canvas layer, the second canvas layer, and the third canvas layer that are not rendered and displayed are transparent.

10. An electronic device, comprising:
　　a processor; and
　　a memory, comprising one or more computer program modules,
　　wherein the one or more computer program modules are stored in the memory and are configured to be executed by the processor, and the one or more computer program modules comprise instructions for implementing the video processing method according to claim 1.

11. A non-transitory computer-readable storage medium, wherein the non-transitory computer-readable storage medium is configured to store non-volatile computer-readable instructions, and in a case where the non-volatile computer-readable instructions are executed by a computer, the video processing method according to claim 1 is implemented.

12. The method according to claim 2, wherein the first style image is the captured image based on which the first style image is obtained, and the second style image is an image that is obtained by performing style transfer on the captured image based on which the second style image is obtained.

13. The method according to claim 2, further comprising:
　　in response to a second triggering event occurring during a display process of the image switching animation, controlling the dynamic process to stop and displaying an image of the image switching animation corresponding to a moment when the dynamic process stops.

14. The method according to claim 3, further comprising:
　　in response to a second triggering event occurring during a display process of the image switching animation, controlling the dynamic process to stop and displaying an image of the image switching animation corresponding to a moment when the dynamic process stops.

15. The method according to claim 2, wherein the initial image further comprises a first preset image, the first preset image surrounds the first style image; and
　　the target image further comprises a second preset image, and the second preset image surrounds the second style image.

16. The method according to claim 2, wherein the image switching animation is displayed by performing image rendering on a first canvas layer, a second canvas layer, and a third canvas layer, the second canvas layer is closer to a display side than the first canvas layer, and the third canvas layer is closer to the display side than the second canvas layer;
　　the switching material is rendered on the third canvas layer, the portion of the initial image at the position where the second image area is located is rendered on the second canvas layer, and the portion of the target image at the position where the third image area is located is rendered on the first canvas layer; and
　　areas in the first canvas layer, the second canvas layer, and the third canvas layer that are not rendered and displayed are transparent.

17. The method according to claim 3, wherein the image switching animation is displayed by performing image rendering on a first canvas layer, a second canvas layer, and a third canvas layer, the second canvas layer is closer to a display side than the first canvas layer, and the third canvas layer is closer to the display side than the second canvas layer;
　　the switching material is rendered on the third canvas layer, the portion of the initial image at the position where the second image area is located is rendered on the second canvas layer, and the portion of the target image at the position where the third image area is located is rendered on the first canvas layer; and
　　areas in the first canvas layer, the second canvas layer, and the third canvas layer that are not rendered and displayed are transparent.

18. An electronic device, comprising:
　　a processor; and
　　a memory, comprising one or more computer program modules,
　　wherein the one or more computer program modules are stored in the memory and are configured to be executed by the processor, and the one or more computer program modules comprise instructions for implementing the video processing method according to claim 2.

19. A non-transitory computer-readable storage medium, wherein the non-transitory computer-readable storage medium is configured to store non-volatile computer-readable instructions, and in a case where the non-volatile computer-readable instructions are executed by a computer, the video processing method according to claim 2 is implemented.

20. A video processing apparatus, comprising:
　　a display unit, configured to display an initial image, wherein the initial image comprises a first style image, and the first style image is an image that is obtained based on a captured image obtained by capturing a target object; and
　　a switching unit, configured to display an image switching animation in response to a first triggering event for the target object being detected, wherein the image switching animation is used to demonstrate a dynamic process of switching from the initial image to a target image, the target image comprises a second style image, the second style image is an image that is obtained based on a captured image obtained by capturing the target object, and the first style image and the second style image are images of different styles,
　　wherein the display unit is further configured to display the target image in response to completion of displaying the image switching animation,
　　a switching image in the image switching animation comprises a first image area, a second image area, and a third image area, the first image area is located between the second image area and the third image area, and the first image area covers an entire image area of the image switching animation in a time-sharing way through position movement during the dynamic process and undergoes shape change during the position movement, the first image area is used to display a switching material, the second image area is used to display a portion of the initial image, the portion of the initial image is at a position where the second image area is located, the third image area is used to display a portion of the target image, and the portion of the target image is at a position where the third image area is located, and the portion of the initial image on the second image area and the portion of the target image on the third image area are obtained by capturing the target object at a same time.

* * * * *